United States Patent
Huang et al.

(10) Patent No.: US 8,049,784 B2
(45) Date of Patent: Nov. 1, 2011

(54) ANTI-SHAKE DEVICE FOR OPTICAL INSTRUMENT

(75) Inventors: Dun-Kui Huang, Taichung (TW); Bing-Ren Lai, Taichung (TW)

(73) Assignee: Asia Optical Co., Inc., Tepz, Taichung (TW)

( * ) Notice: Subject to any disclaimer, the term of this patent is extended or adjusted under 35 U.S.C. 154(b) by 434 days.

(21) Appl. No.: 12/269,194

(22) Filed: Nov. 12, 2008

(65) Prior Publication Data

US 2010/0002087 A1 Jan. 7, 2010

(30) Foreign Application Priority Data

Jul. 2, 2008 (TW) ................................ 97124866 A

(51) Int. Cl.
*H04N 5/228* (2006.01)
*H04N 5/225* (2006.01)
*G03B 17/00* (2006.01)

(52) U.S. Cl. ...................... 348/208.7; 348/374; 396/55

(58) Field of Classification Search ............. 348/208.99, 348/208.4, 208.7, 374; 396/55
See application file for complete search history.

(56) References Cited

U.S. PATENT DOCUMENTS

| | | | |
|---|---|---|---|
| 7,426,340 B2 * | 9/2008 | Seo ................................ | 396/153 |
| 7,493,029 B2 * | 2/2009 | Liao et al. ........................ | 396/55 |
| 7,536,091 B2 * | 5/2009 | Nomura et al. .................. | 396/55 |
| 7,583,891 B2 * | 9/2009 | Hirunuma et al. .............. | 396/55 |
| 2007/0096677 A1 * | 5/2007 | Hirunuma et al. ............. | 318/649 |
| 2009/0086037 A1 * | 4/2009 | Chang et al. ............. | 348/208.7 |
| 2009/0091632 A1 * | 4/2009 | Okamoto et al. .......... | 348/208.7 |
| 2009/0316011 A1 * | 12/2009 | Huang ........................ | 348/208.7 |
| 2010/0091122 A1 * | 4/2010 | Irisawa et al. .............. | 348/208.7 |
| 2011/0129206 A1 * | 6/2011 | Muramatsu .................... | 396/55 |

FOREIGN PATENT DOCUMENTS

CN 101414036 A * 4/2009
TW 200951605 A * 12/2009

* cited by examiner

*Primary Examiner* — John Villecco
(74) *Attorney, Agent, or Firm* — Thomas|Kayden

(57) ABSTRACT

An anti-shake device for positioning an image-capturing unit in an optical instrument. A base includes a shaft pillar. A clamp unit includes a first clamping arm and a second clamping arm. The first and second clamping arms pivot to the shaft pillar of the base and detachably clamp the image-capturing unit. A drive unit is connected to the base and includes a driven member driving the first and second clamping arms of the clamp unit to rotate and shifting between a first mode and a second mode. The first and second clamping arms are separated from each other and the image-capturing unit when the driven member is in the first mode. The first and second clamping arms close and clamp the image-capturing unit when the driven member is in the second mode.

12 Claims, 6 Drawing Sheets

ANTI-SHAKE DEVICE FOR OPTICAL INSTRUMENT

CROSS REFERENCE TO RELATED APPLICATIONS

This Application claims priority of Taiwan Patent Application No. 97124866, filed on Jul. 2, 2008, the entirety of which is incorporated by reference herein.

BACKGROUND OF THE INVENTION

1. Field of the Invention

The invention relates to an anti-shake device, and more particularly to an anti-shake device for an optical instrument that provides positioning functions with a clamping manner.

2. Description of the Related Art

In a conventional anti-shake digital camera, a driving circuit drives a floating image-capturing unit to move at a high speed in two directions on a plane perpendicular to an optical axis, suppressing a blurred image or preventing a blurred image from occurring due to shakes during image capture, and further providing anti-shake functions.

Referring to FIG. 1 and FIG. 2, a conventional anti-shake device 1 is employed to quickly position an image-capturing unit A which has been moved at a high speed. The anti-shake device 1 comprises a cam 11, a transmission unit 12, a positioning member 13, and a torsion spring 14. The transmission unit 12 is connected to the cam 11. The positioning member 13 is abutted between the cam 11 and the image-capturing unit A. The torsion spring 14 is disposed on a fulcrum 131 of the positioning member 13. The transmission unit 12 drives the cam 11 to rotate, thereby driving the positioning member 13 to rotate between a fixing position and a separating position around the fulcrum 131. The torsion spring 14 persistently presses the positioning member 13 toward the image-capturing unit A, such that the positioning member 13 rotates in a curved way, similar to movement of a seesaw, around the fulcrum 131.

When the image-capturing unit A is positioned, the transmission unit 12 drives the cam 11 to rotate, shifting the positioning member 13 to the fixing position. The torsion spring 14 then presses the positioning member 13 to the image-capturing unit A, positioning the image-capturing unit A. On the contrary, when the image-capturing unit A is to move freely, the transmission unit 12 also drives the cam 11 to rotate, enabling the positioning member 13 to shift to the separating position in a clockwise way along a curved line B.

Nevertheless, the conventional anti-shake device 1 has the following drawbacks. As the positioning member 13 is displaced and rotated in a curved way, positioning deviation easily occurs. To suppress the positioning deviation, the manufacturing and assembly precision of the positioning member 13 must be enhanced, thus increasing manufacturing costs and assembly time of the anti-shake device 1. Moreover, because the positioning member 13 abuts only one side of the image-capturing unit A, the other side of the image-capturing unit A is easily raised, causing inclination of the image-capturing unit A. Thus, an imaging surface of the image-capturing unit A cannot be symmetrical to the optical axis, causing aberration of imaging. Additionally, as the positioning member 13 must securely press the image-capturing unit A, a high coefficient of elasticity is required for the torsion spring 14. Therefore, to effectively separate the positioning member 13 from the image-capturing unit A, a driving force from the transmission unit 12 must be increased, increasing consumption of electric power.

Hence, there is a need for an anti-shake device for an optical instrument with reduced manufacturing costs, aberration of imaging, and power consumption.

BRIEF SUMMARY OF THE INVENTION

A detailed description is given in the following embodiments with reference to the accompanying drawings.

An exemplary embodiment of the invention provides an anti-shake device for positioning an image-capturing unit in an optical instrument. The anti-shake device comprises a base, a clamp unit, and a drive unit. The base comprises a shaft pillar. The clamp unit comprises a first clamping arm and a second clamping arm. The first and second clamping arms pivot to the shaft pillar of the base and detachably clamp the image-capturing unit. The drive unit is connected to the base and comprises a driven member driving the first and second clamping arms of the clamp unit to rotate and shifting between a first mode and a second mode. The first and second clamping arms are separated from each other and the image-capturing unit when the driven member is in the first mode. The first and second clamping arms close and clamp the image-capturing unit when the driven member is in the second mode.

The first and second clamping arms position the image-capturing unit using a clamping manner, such that a positioning effect can be achieved and inclination of the image-capturing unit can be prevented when the precision of members of the anti-shake device is not high. In addition to reducing manufacturing costs and preventing aberration of imaging, the anti-shake device enables the first and second clamping arms to separate from the image-capturing unit with a small driving force.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
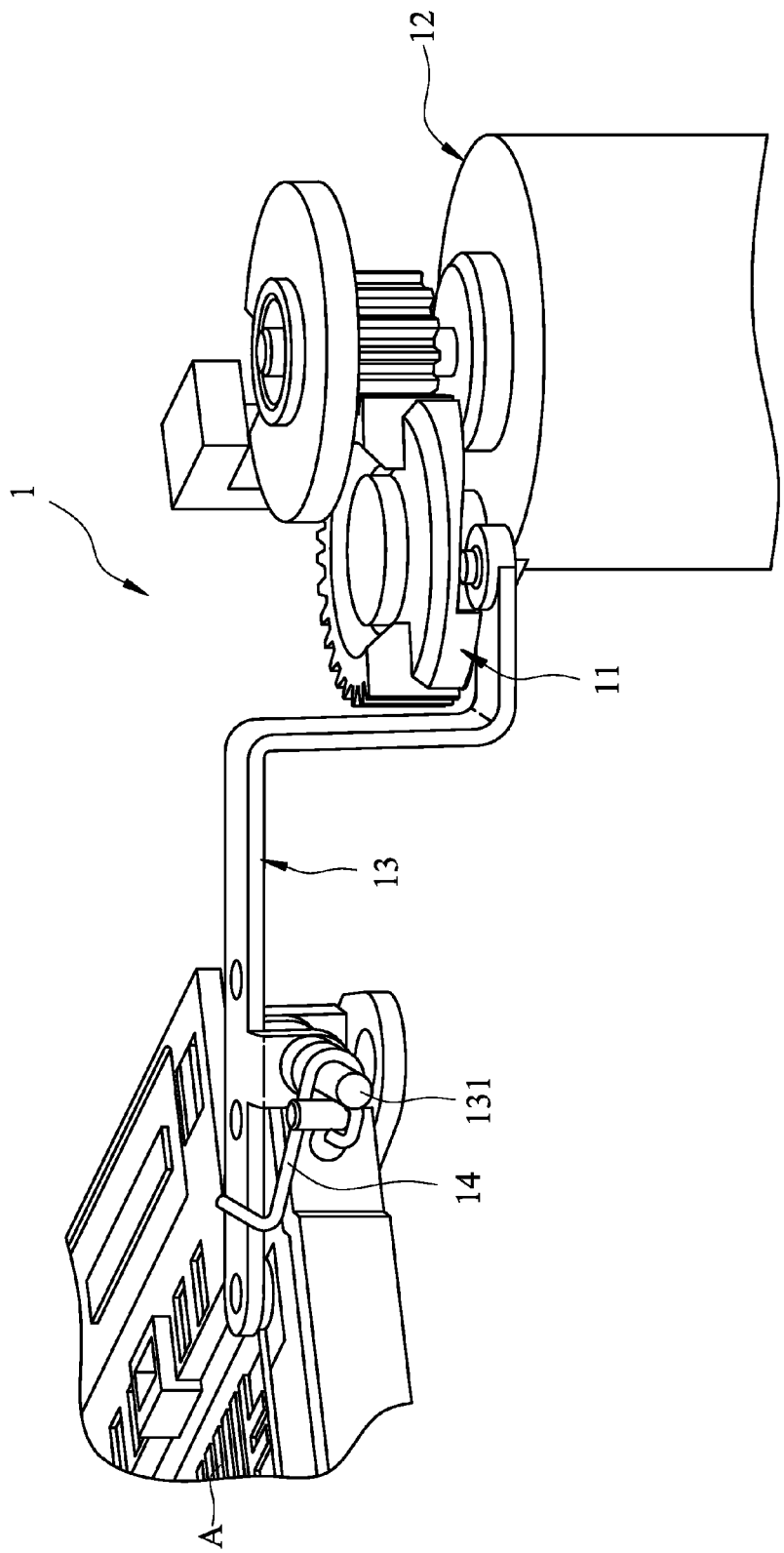
FIG. 1 is a schematic perspective view of a conventional anti-shake device in a fixing position.
Figure 2:
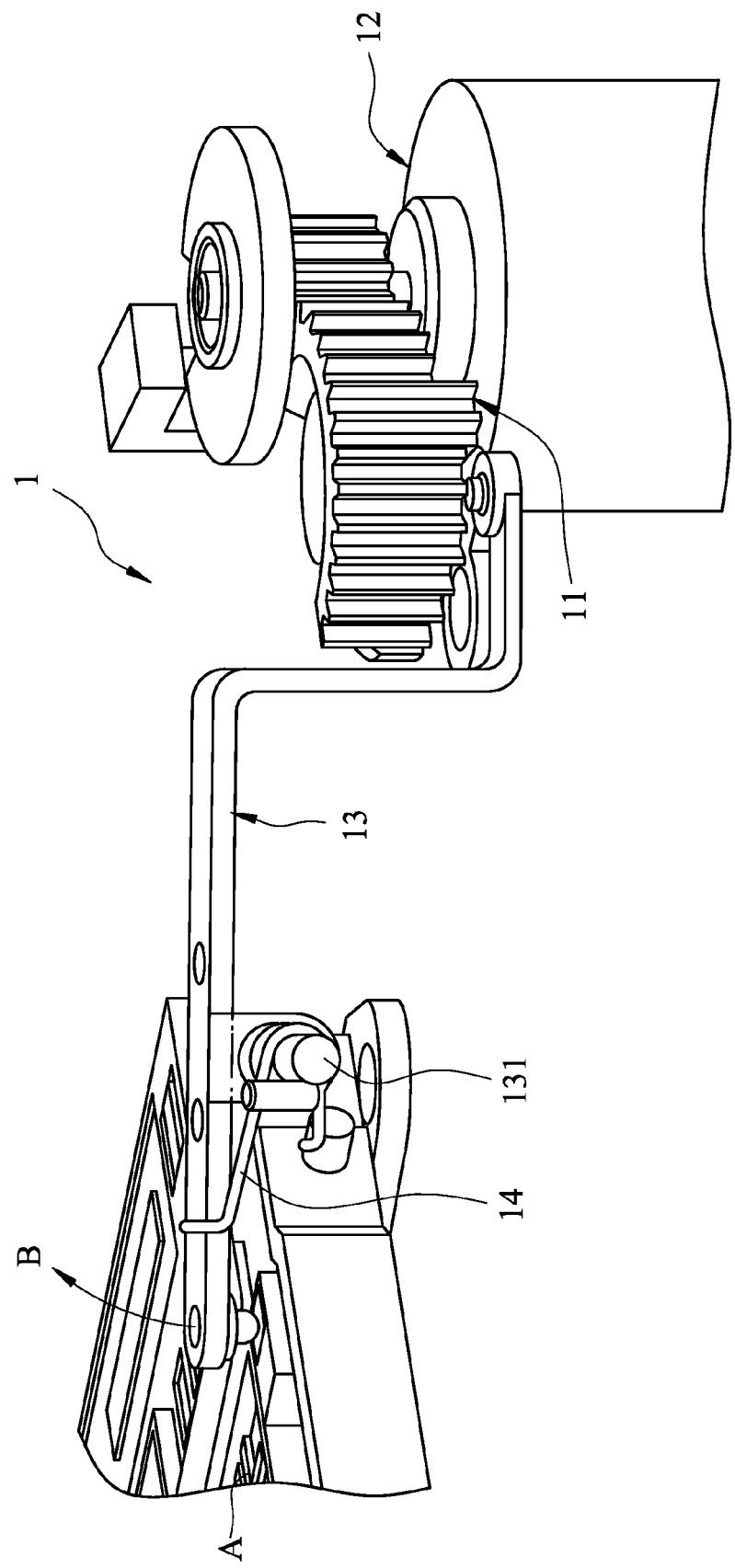
FIG. 2 is a schematic perspective view of the conventional anti-shake device in a separating position.
Figure 3:
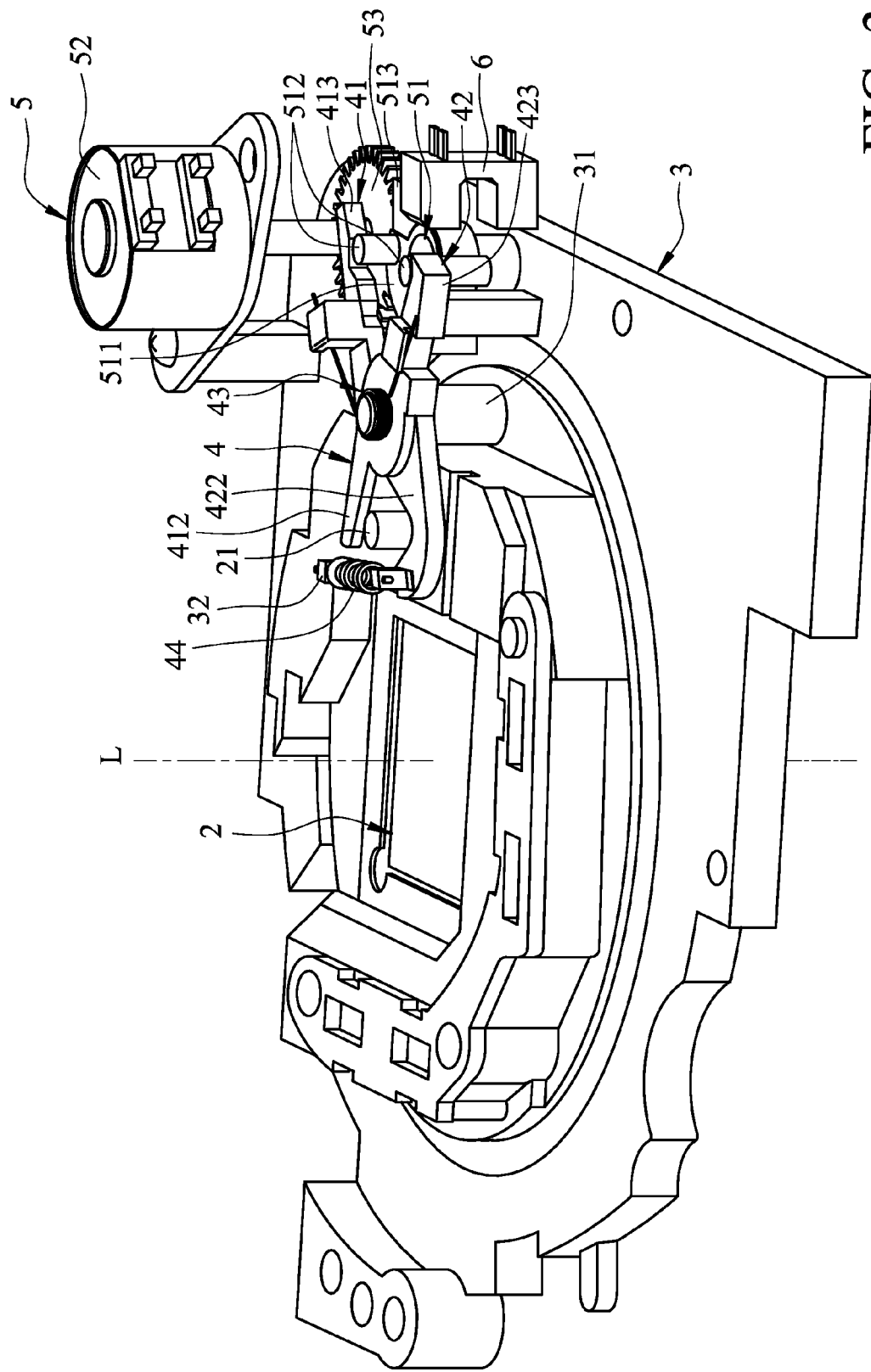
FIG. 3 is a schematic perspective view of an anti-shake device, with two clamping portions separated from a positioning pillar of an image-capturing unit, for an optical instrument of a preferred embodiment of the invention.
Figure 5:
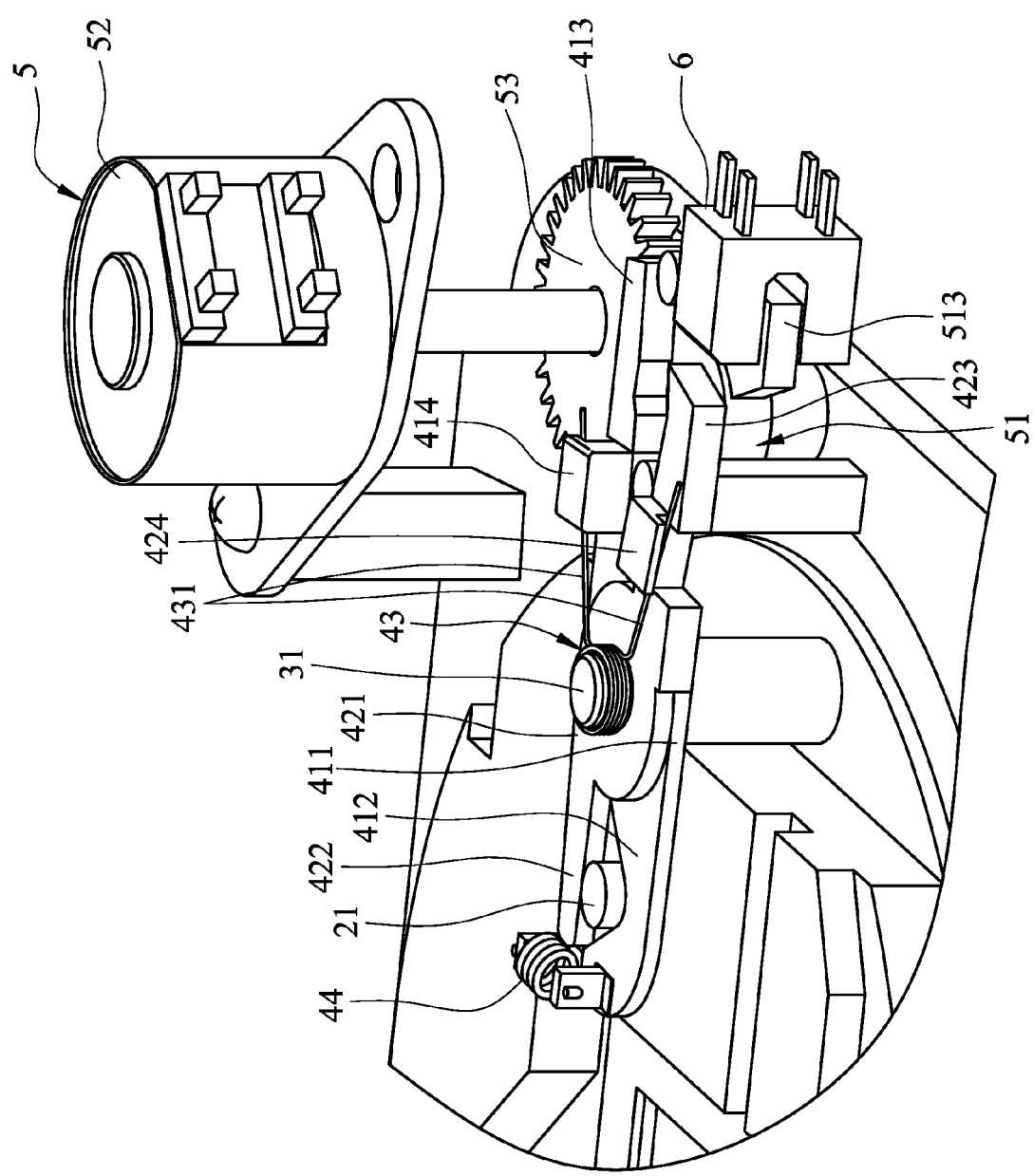
FIG. 5 is a schematic perspective view showing the clamping portions clamping the positioning pillar of the image-capturing unit.

Referring to FIG. 3 and FIG. 5, an anti-shake device for positioning an image-capturing unit 2 in an optical instrument is disclosed. The image-capturing unit 2 comprises an optical axis L and a positioning pillar 21 extending along the optical axis L. The anti-shake device comprises a base 3, a clamp unit 4, a drive unit 5, and a sensor 6.

The base 3 comprises a shaft pillar 31 and a protruding pillar 32.

The clamp unit 4 comprises a first clamping arm 41, a second clamping arm 42, a resilient member 43, and a repositioning member 44. The first clamping arm 41 and second clamping arm 42 pivot to the shaft pillar 31 of the base 3. The resilient member 43 is connected to the first clamping arm 41 and second clamping arm 42. The repositioning member 44 is connected to the protruding pillar 32 and first clamping arm 41, constantly forcing the first clamping arm 41 to move closer to the protruding pillar 32 of the image-capturing unit 2. The first clamping arm 41 and second clamping arm 42 detachably clamp the protruding pillar 32 of the image-capturing unit 2. The first clamping arm 41 comprises a pivoting portion 411, a clamping portion 412, and a driving portion 413. The second clamping arm 42 comprises a pivoting portion 421, a clamping portion 422, and a driving portion 423. The pivoting portions 411, 421 pivot to the shaft pillar 31. The clamping portions 412, 422 and driving portions 413, 423 extend in reverse from the pivoting portions 411, 421. The driving portions 413, 423 respectively comprise a protrusion 414 and a protrusion 424. The resilient member 43 is fit on the shaft pillar 31 and comprises two abutting portions 431 respectively abutting the protrusions 414 and 424, constantly forcing the driving portions 413, 423 to close. In this embodiment, the resilient member 43 is a torsion spring. Specifically, the resilient member 43 may be an extension spring. When the resilient member 43 is an extension spring, two ends thereof are respectively connected to the protrusions 414 and 424, achieving the same effect of constantly forcing the driving portions 413, 423 to close.

The drive unit 5 is connected to the base 3 and comprises a driven member 51, a driving member 52, and an active member 53. The driven member 51 drives the first clamping arm 41 and second clamping arm 42 of the clamp unit 4 to rotate and shifts between a first mode and a second mode. The driving member 52 is disposed on the base 3. The active member 53 is connected to the driving member 52, driving the driven member 51 to rotate around its own axis. Specifically, the active member 53 drives the driven member 51 to rotate by way of friction or engagement. In this embodiment, the driving member 52 is a motor, the active member 53 drives the driven member 51 to rotate with an engaging manner, and the active member 53 is a gear. The driven member 51 comprises a pivot 511, two tappets 512, and a detecting blade 513. The pivot 511 pivots to the base 3 and engages the active member 53. The tappets 512 extend from the pivot 511. The detecting blade 513 extends along a radial direction thereof. When the driven member 51 is in the first mode, the tappets 512 respectively push the driving portions 413, 423, forcing the clamping portions 412, 422 to separate from each other. When the driven member 51 is in the second mode, the clamping portions 412, 422 clamp the positioning pillar 21 along a direction perpendicular to the optical axis L (i.e. the clamping portions 412, 422 close in a horizontal direction in FIG. 4).

The sensor 6 detects the position of the detecting blade 513 of the drive unit 5.

Figure 4:
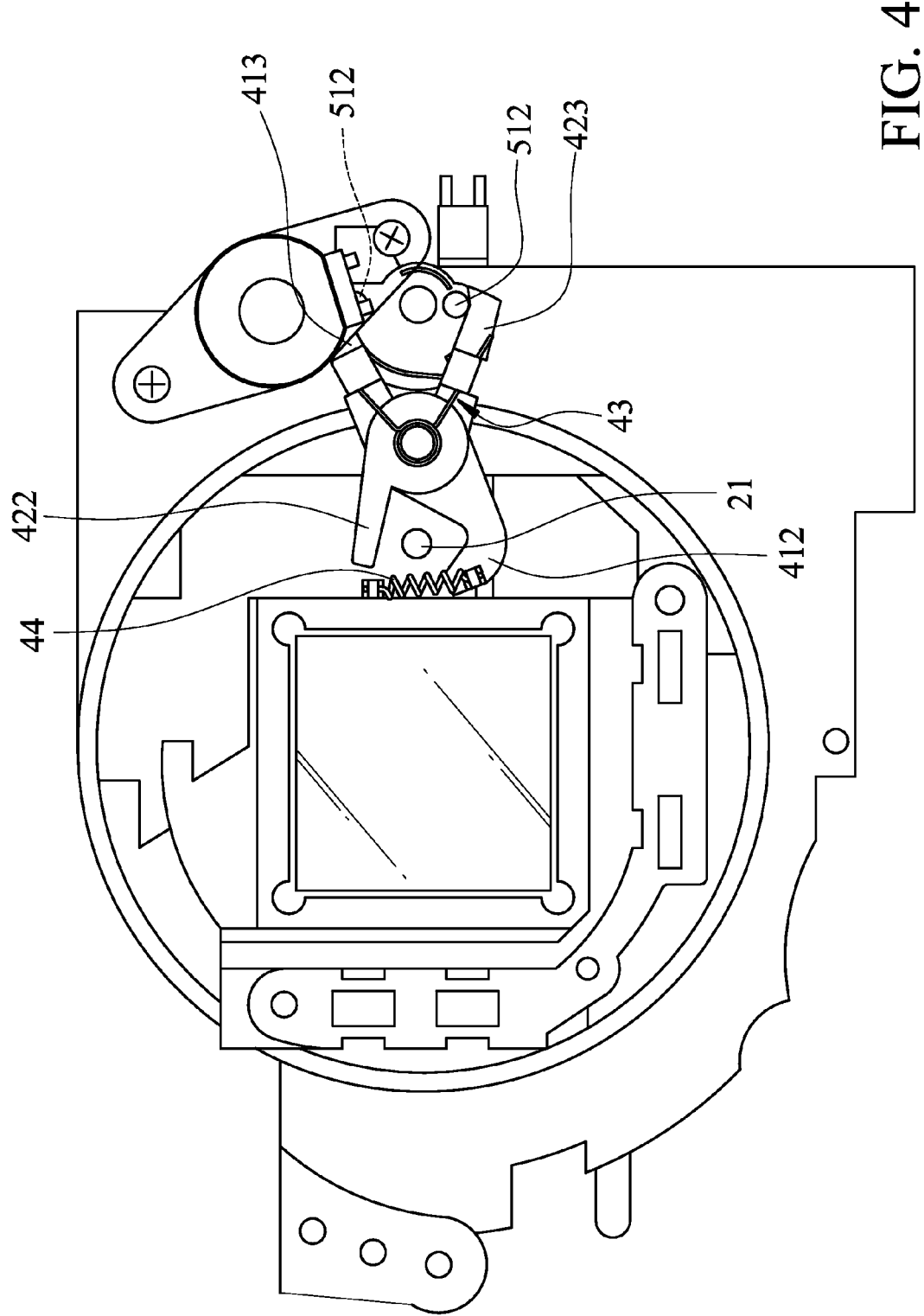
FIG. 4 is a schematic top view showing the clamping portions separated from the positioning pillar.
Figure 6:
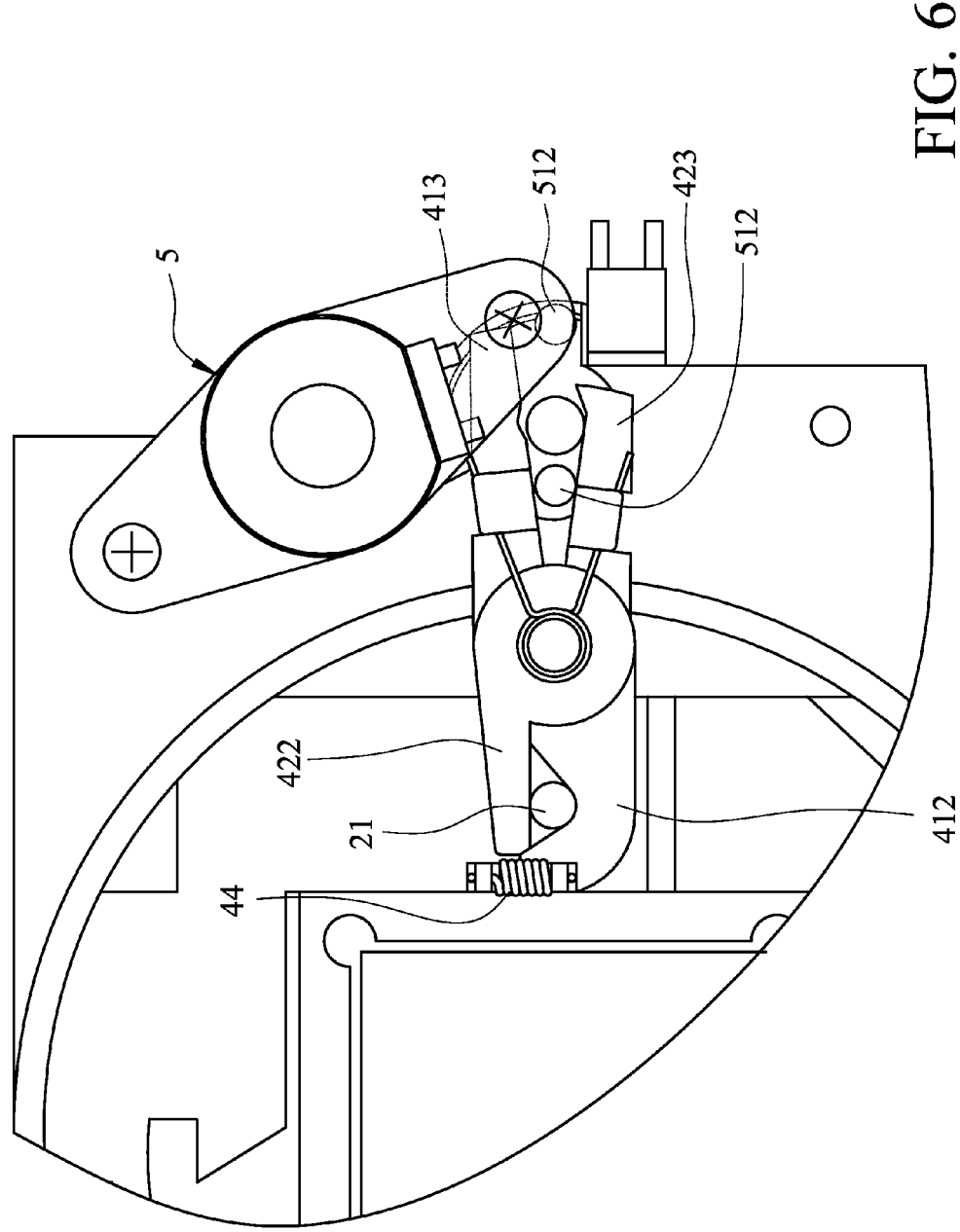
FIG. 6 is a schematic top view showing the clamping portions clamping the positioning pillars.

When the image-capturing unit 2 is positioned, as shown in FIG. 5 and FIG. 6, the driving member 52 of the drive unit 5 drives the driven member 51 to rotate to the second mode and enables the detecting blade 513 to be in the sensor 6. At the same time, the driving portions 413, 423 and clamping portions 412, 422 are operated by the resilient member 43 and repositioning member 44, respectively. The clamping portions 412, 422 close and clamp the positioning pillar 21, thereby positioning the image-capturing unit 2. Specifically, as the technique of closing and clamping the positioning pillar 21 of the clamping portions 412, 422 (first clamping arm 41 and second clamping arm 42) differs from that of unidirectional pressing of the positioning member 13 in the prior art, the coefficient of elasticity of the resilient member 43 is not necessarily high. On the contrary, when the image-capturing unit 2 is to move freely, as shown in FIG. 3 and FIG. 4, the driven member 51 is rotated to the first mode, enabling the detecting blade 513 to be removed from the sensor 6. At the same time, the driving portions 413, 423 of the clamp unit 4 are removed from each other by pushing of the tappets 512, forcing the clamping portions 412, 422 to be removed from each other and separated from the positioning pillar 21.

Accordingly, the disclosed anti-shake device has many advantages. As the first clamping arm 41 and second clamping arm 42 of the clamp unit 4 close to clamp the positioning pillar 21 of the image-capturing unit 2, positioning deviation generated by curved rotation and displacement, such as that of the conventional positioning member 13, can be prevented. Thus, an effect for positioning the positioning pillar 21 can be achieved and assembly time of the anti-shake device can be reduced when the precision of members thereof is not high, thereby reducing manufacturing costs thereof. Moreover, because the positioning pillar 21 is clamped by the first clamping arm 41 and second clamping arm 42, force application on two sides of the image-capturing unit 2 is uniform and rising of one side thereof can be prevented. Accordingly, an imaging surface of the image-capturing unit 2 can be maintained symmetrical to the optical axis L, thereby preventing aberration of imaging from occurring. Additionally, when the image-capturing unit 2 is positioned, the first clamping arm 41 and second clamping arm 42 are driven to rotate by the resilient member 43 and repositioning member 44. The positioning pillar 21 can move freely after separating from the clamping portions 412, 422. The driving member 52 can drive the clamping portions 412, 422 to separate from the positioning pillar 21 with a small force.

Specifically, in the disclosed anti-shake device, the driving portions 413, 423 of the first clamping arm 41 and second clamping arm 42 may be omitted. Here, the driven member 51 is disposed between the clamping portions 412, 422, and the abutting portions 431 of the resilient member 43 are respectively connected to the clamping portions 412, 422, achieving the same effect of clamping the positioning pillar 21. Moreover, the clamping direction of the first clamping arm 41 and second clamping arm 42 is not limited to being perpendicular to the optical axis L.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An anti-shake device for positioning an image-capturing unit in an optical instrument, comprising:
   a base comprising a shaft pillar;
   a clamp unit comprising a first clamping arm, a second clamping arm, and a resilient member connected to the first and second clamping arms, wherein the first and second clamping arms pivot to the shaft pillar of the base and detachably clamp the image-capturing unit, either of the first and second clamping arms comprises a driving portion, and the resilient member is fit on the shaft pillar and comprises two abutting portions abutting the driving portions, constantly forcing the driving portions to close; and a drive unit connected to the base and comprising a driven member driving the first and second clamping arms of the clamp unit to rotate and shifting between a first mode and a second mode, wherein the first and second clamping arms are separated from each other and the image-capturing unit when the driven member is in the first mode, and the first and second clamping arms close and clamp the image-capturing unit when the driven member is in the second mode.

2. The anti-shake device as claimed in claim 1, wherein the first and second clamping arms close and clamp the image-capturing unit by the resilient member when the driven member of the drive unit is in the second mode.

3. The anti-shake device as claimed in claim 2, wherein either of the first and second clamping arms further comprises a pivoting portion and a clamping portion, the pivoting portions pivot to the shaft pillar, the clamping and driving portions extend in reverse from the pivoting portion, and the driven member abuts the driving portions when in the first mode, forcing the clamping portions to separate from each other and the image-capturing unit.

4. The anti-shake device as claimed in claim 1, wherein either of the driving portions comprises a protrusion abutting either of the abutting portions.

5. The anti-shake device as claimed in claim 4, wherein the resilient member comprises a torsion spring.

6. The anti-shake device as claimed in claim 1, wherein the image-capturing unit comprises an optical axis and a positioning pillar extending along the optical axis, the clamp unit further comprises the resilient member connected to the first and second clamping arms, and the first and second clamping arms close in a direction perpendicular to the optical axis and clamp the positioning pillar by the resilient member when the driven member of the drive unit is in the second mode.

7. The anti-shake device as claimed in claim 6, wherein the base further comprises a protruding pillar, and the clamp unit further comprises a repositioning member connected to the protruding pillar and first clamping arm, constantly forcing the first clamping arm to move closer to the protruding pillar.

8. The anti-shake device as claimed in claim 7, wherein the repositioning member comprises an extension spring.

9. The anti-shake device as claimed in claim 1, wherein the drive unit further comprises a driving member and an active member, the driving member is disposed on the base, and the active member is connected to the driving member, driving the driven member to rotate around its own axis.

10. The anti-shake device as claimed in claim 9, wherein the driving member comprises a motor, and the active member comprises a gear engaging the driven member.

11. The anti-shake device as claimed in claim 10, wherein the driven member comprises a pivot and two tappets, the pivot pivots to the base and engages the active member, the tappets extend from the pivot, and when the driven member is in the first mode, the tappets respectively push the first and second clamping arms, forcing the first and second clamping arms to separate from the image-capturing unit.

12. The anti-shake device as claimed in claim 11, wherein the driven member further comprises a detecting blade extending along a radial direction thereof, and the anti-shake device further comprises a sensor detecting the position of the detecting blade.

* * * * *